United States Patent

Sudler et al.

[11] 4,041,336
[45] Aug. 9, 1977

[54] SINGLE PHASE STEPPER MOTOR

[75] Inventors: Roland Sudler; Klaus-Dieter Hartung, both of Frankfurt, Germany

[73] Assignee: VDO Adolf Schindling AG, Frankfurt am Main, Germany

[21] Appl. No.: 641,561

[22] Filed: Dec. 17, 1975

[30] Foreign Application Priority Data

Jan. 27, 1975 Germany .............................. 2503206

[51] Int. Cl.² .............................................. H02K 37/00
[52] U.S. Cl. ................................... 310/49 R; 310/156; 310/162
[58] Field of Search ................... 310/49, 156, 162–164

[56] References Cited

U.S. PATENT DOCUMENTS

| 2,001,914 | 5/1935 | Lenehan | 310/164 |
| 2,034,499 | 3/1936 | Warren | 310/164 |
| 3,142,774 | 7/1964 | Lundin | 310/164 X |
| 3,711,732 | 1/1973 | Gerber et al. | 310/43 X |
| 3,840,761 | 10/1974 | Müller | 310/49 R |

Primary Examiner—Donovan F. Duggan
Attorney, Agent, or Firm—Otto John Munz

[57] ABSTRACT

A single-phase stepper motor with a bipolar or multipolar permanent magnet rotor and a stator with two L-shaped stator parts. Each stator part is provided at one end with a pole shoe that has main poles and auxiliary poles. A bridge with windings connects the ends of thestator parts which do not have pole shoes. Magnetically saturable intermediate parts connect the stator parts at opposite sides of the pole shoes, whereby the stator parts and the intermediate parts form a single one-piece unit.

8 Claims, 2 Drawing Figures

SINGLE PHASE STEPPER MOTOR

BACKGROUND OF THE INVENTION

1. Field of the Invention

The invention relates to a novel design of a single-phase stepper motor with a permanent magnet rotor.

2. Description of the Prior Art

A number of single-phase stepper motors of the type described above are already known which differ essentially only in the structure of the main poles and auxiliary poles. Thus, single-phase stepper motors are known wherein the pole shoes have salient main poles and auxiliary poles which project radially toward the rotor and differ by their different heights. In other known single-phase stepper motors, the two poles shoes are each provided with an approximately semicircular recess concentric with the rotor shaft. These recesses in each case serve as the main pole, while the auxiliary pole or poles are separated in space from the stator. Other known single-phase stepper motors have poles shoes with approximately semicircular recesses which are eccentric with respect to the rotor shaft. In such structures, the main poles and auxiliary poles are formed by the different distances of the recesses from the rotor periphary.

All these and other, similarly constructed, single-phase stepper motors have the disadvantage that even minor changes in position of the two stator parts with respect to each other, due to manufacturing tolerances, result in substantial increases of the starting voltage and in lowered efficiency. This is the case particularly in single-phase stepper motors intended for use in electronic battery clocks wherein, for the purpose of achieving a high efficiency and a low starting voltage, the two stator parts with the pole shoes must be mutually aligned with a precision of a few hundredth parts of 1 millimeter. To be sure, by molding certering pins that engage the stator parts to the clockwise plates, if the clockwork plates consist of metal, the required precise alignment can be accomplished, but the employment of metallic clockwise plates instead of plastic plates render the clockwise much more expensive. Moreover, even with highly precise alignment of the stator parts with repsect to each other and to the rotor, the amount of starting voltage and the efficiency are unsatisfactory in known single-phase stepper motors, which is the case especially when the motors are intended for clockworks to be operated with 1.5 volt batteries.

SUMMARY OF THE INVENTION

These disadvantages of the known single-phase stepper motors are to be eliminated by the invention. Therefore, the invention is in a single-phase stepper motor which requires the lowest possible starting voltage, i.e., a starting voltage of about 1 volt or less, and operates with the highest possible efficiency and/or the lowrest possible energy consumption. Moreover, the motor should contain only a small number of parts, and its manufacture and assembly should also be as inexpensive as possible.

This problem is solved according to the invention, on the basis of the single-phase stepper motor initially described, by the device of connecting each of the two stator parts at the opposite of the pole shoes by means of an intermediate part which is magnetically saturable when the stator winding is being energized, so that these two stator parts form a single-piece unit.

Thus, a structure preferred for ease of manufacture and assembly is achieved. It permits a fully automatic mounting of the stator parts, as a unit, to a clockwork plate, which has hitherto not been possible. It also permits a highly precise alignment of the stator parts, which does not vary from stator to stator, and therefore permits problem-free quantity production. Moreover, because of this highly precise alignment, a single phase stepper motor provided with such a stator requires a relatively low starting voltage and presents an above-average efficiency.

The construction of the pole shoes with regard to the main poles and the auxiliary poles may be basically the same as in the known single-phase stepper motors. More practical, however, is a structure wherein the length of the permanent magnet of the rotor is greater than the effective length of the stator, and each pole shoe is provided with a semicircular recess concentric with the rotor shaft and serving as main pole, and is provided at least on the stator front side with a metal sheet with at least one extension which projects radially toward the rotor and beyond the recess and serves as auxiliary pole. Such an embodiment offers the advantage of further improving the efficiency and further lowering the required starting voltage, though only to a small extent.

An additional increase in efficiency and decrease of the starting voltage can be achieved, according to another concept of the invention, by using a permanent magnet for the rotor that is larger than the efficient length of the stator, by providing each pole with a semicircular recess concentric with the rotor shaft and serving as main pole, and by providing in the stator near the recess edge at least one elevation serving as auxiliary pole, whose longitudinal axis extends in a direction parallel or approximately parallel to the rotor shaft. This elevation or these elevations may be produced, in a sutiable embodiment, by means of a pin inserted in the stator, or in a structure particularly favorable with respect to manufacture, by a pin-shaped embossing molded to the stator. In another advantageous embodiment each elevation is produced by a reduction in the material of the recess edge. In the two last-mentioned embodiments, the stator parts with the elevation or elevations forming a single-piece unit can be manufactured in a single operation on a press, which has a favorable effect upon the production cost.

Since, with a single extension serving as auxiliary pole or a single elevation operating as auxiliary pole in the stator, and with a multipolar permanent magnet rotor of the type usually employed, torque variations may occur from one switching step to the next, it is advisable, when an m-poles rotor is used ($m = 2,4,6,8,\ldots n$), to provide m elevations or extensions, each of one pair facing the other radially. In this case, a pair of elevations or extensions is displaced by 360/4m degrees of angle with respect to the main flux direction, and the individual pairs are displaced with respect to each other by 260/m degrees of angle. Thus torque variations can be safely eliminated. Besides, it is apparent that, when in a permanent magnet rotor containing six, eight or more poles, a pair of elevations or extensions is dispensed with, which may be necessary under certain circumstances when an elevation pair happens to be located in the area of the saturable intermediate part, torque variations occur, but they are negligible.

A further decrease of the required starting voltage and an additional increase in efficiency can be achieved by making the stator from a soft magnetic material of small coercive force. Good results were obtained with the materials known under the tradename HYPERM, namely Hyperm 766, Herperm 800, Herperm 900 and Herperm Max., and with the materials known under the tradename MUMETALL. Most of these materials are suited for cold shaping, so that the stator can be punched out.

An even more favorable starting voltage and an even better efficiency can be achieved with a coil element for the stator winding that consists of a thermoplastic material, by applying the coil element by injection molding directly to the stator bridge. In a coil element thus applied, the coil element portions abutting the longitudinal sides of the bridge can be made extremely thin, so that only a small air gap exists between the first winding layer and the bridge. This has a favorable effect upon the starting voltage and the motor efficiency.

DESCRIPTION OF THE PREFERRED EMBODIMENT

Figure 1:
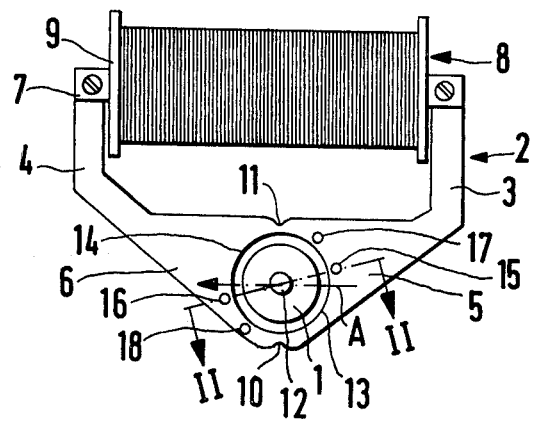
FIG. 1 is a plan view of a single-phase stepper motor.
Figure 2:
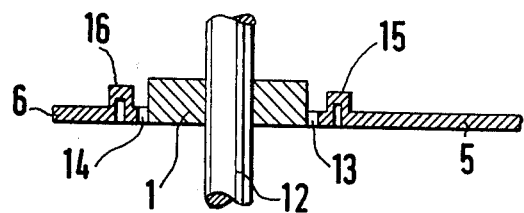
FIG. 2 is a sectional view through the single-phase stepper motor of FIG. 1 along line II — II.

The single-phase stepper motor comprises a six-pole permanent magnet rotor 1 and a stator 2 with two L-shaped stator parts 3 and 4, each of which is provided at one end with a pole shoe 5 and 6, respectively, and whose ends without pole shoes are connected by a bridge 7. On bridge 7, which is fastened by means of two screws and nuts to stator parts 3 and 4, is provided a stator winding 8, which consists of a coil element 9 of plastic material, directly applied by injection molding to the stator bridge 7. The coil element comprises a plurality of wire windings. The length of the permanent magnet of rotor 1 equals or exceeds the effective height or, respectively, thickness of stator 2.

The two pole shoes 5 and 6 are connected at their opposite ends in each case by an intermediate part 10 and 11, respectively, whose cross section is such that, when the stator winding is being energized, the intermediate parts are magnetically saturated and consequently act like an airgap. Intermediate parts 10 and 11, as well as stator parts 3 and 4 with pole shoes 5 and 6, are combined in a one-piece unit which may consist, like the bridge 7, of the material known under the tradename Hyperm 766. Since the thickness of the individual stator components amounts to a few millimeters, generally a thickness of 2 millimeters is chosen, the one-piece unit and the bridge can be punched out without difficulties from Hyperm 766 metal sheets.

The semicircular recesses 13 and 14 in pole shoes 5 and 6, located between the two intermediate parts 10 and 11 and concentric with the rotor shaft 12, form the main poles of the stator. The auxiliary poles of the stator, necessary for an automatic start of the motor, consist of four pinlike embossings 15, 16, 17 and 18 molded to the stator. The longitudinal axis of these embossings extends in a direction parallel to the rotor shaft, and they are located in the direct vicinity of the recess edge. The two radially opposite embossings 15 and 16 are displaced by 360/4m degrees of angle, that is to say, in the present six-pole permanent magnet rotor, they are displaced by 15° % of angle with respect to the main flux direction A, while the two other, radially opposite, embossings 17 and 18 are displaced with respect to the two other embossings 15 and 16 by 60% of angle.

In a motor constructed according to the afore-mentioned characteristics, with a suitable selection of windings of the stator winding, a starting voltage of about 0.6 volt and a current consumption of 100 microamps at 1.3 standard voltage can be achieved without difficulties.

What is claimed is:
1. A single-phase stepper motor comprising:
A. a permanent magnet rotor having a plurality of poles,
B. a stator comprising two L-shaped stator parts, each stator part being provided at one end with a pole shoe comprising main poles and auxiliary poles, the other end of each stator part having no pole shoes,
C. a bridge connecting the ends of the stator parts without pole shoes,
D. a stator winding on the bridge,
E. two intermediate parts connecting the two stator parts at opposite sides of the pole shoes, the intermediate parts being magnetically saturated when the stator winding is energized,
F. the two stator parts and the two intermediate parts forming a single one-piece unit,
G. the length of the permanent magnet of the rotor being greater than the effective length of the stator,
H. each pole shoe being provided with a semicircular recess, concentric with the rotor shaft and serving as a main pole, and
I. on at least one stator front side, a metal sheet with at least one extension protruding radially toward the rotor and beyond the recess and serving as auxiliary pole.
2. A single-phase stepper motor comprising:
A. a permanent magnet rotor having a plurality of poles,
B. a stator comprising two L-shaped stator parts, each stator part being provided at one end with a pole shoe comprising main poles and auxiliary poles, the other end of each stator part having no pole shoes,
C. a bridge connecting the ends of the stator parts without pole shoes,
D. a stator winding on the bridge,
E. two intermediate parts connecting the two stator parts at opposite sides of the pole shoes, the intermediate parts being magnetically saturated when the stator winding is energized,
F. the two stator parts and the two intermediate parts forming a single one-piece unit,
G. the length of the permanent magnet of the rotor exceeding the effective length of the stator,
H. each pole shoe having a semicircular recess, concentric with the rotor shaft and serving as a main pole, and
I. in the vicinity of the recess edge, at least one elevation serving as an auxiliary pole being provided in the stator, whose longitudinal axis extends in a direction at least approximately parallel to the rotor shaft.
3. A motor according to claim 1, wherein each elevation consists of a pin inserted in the stator.
4. A motor according to claim 2, wherein each elevation consists of a pin-shaped embossing molded to the stator.
5. A motor according to claim 2, wherein each elevation comprises a material reduction of the recess edge.

6. A motor according to claim 5 with an m pole rotor, wherein m elevations or extensions are provided, of which in each case one elevation or extension in each pair faces the other radially, in which structure a pair of elevations or extensions is displaced by 360/4m degrees of angle with respect to the main flux direction and the individual pairs are displaced with respect to each other by 360/m degrees of angle.

7. A motor according to claim 6, wherein the stator is constructed of a soft magnetic material of small coercive force.

8. A motor according to claim 7, further comprising a coil element consisting of thermoplastic material, for the stator winding, and wherein the coil element is applied directly by injection molding to the stator bridge.

* * * * *